INVENTORS
TADEUSZ BUDZICH
ARNOLD PITT
By Clau T. Muller, Jr.
Attorney

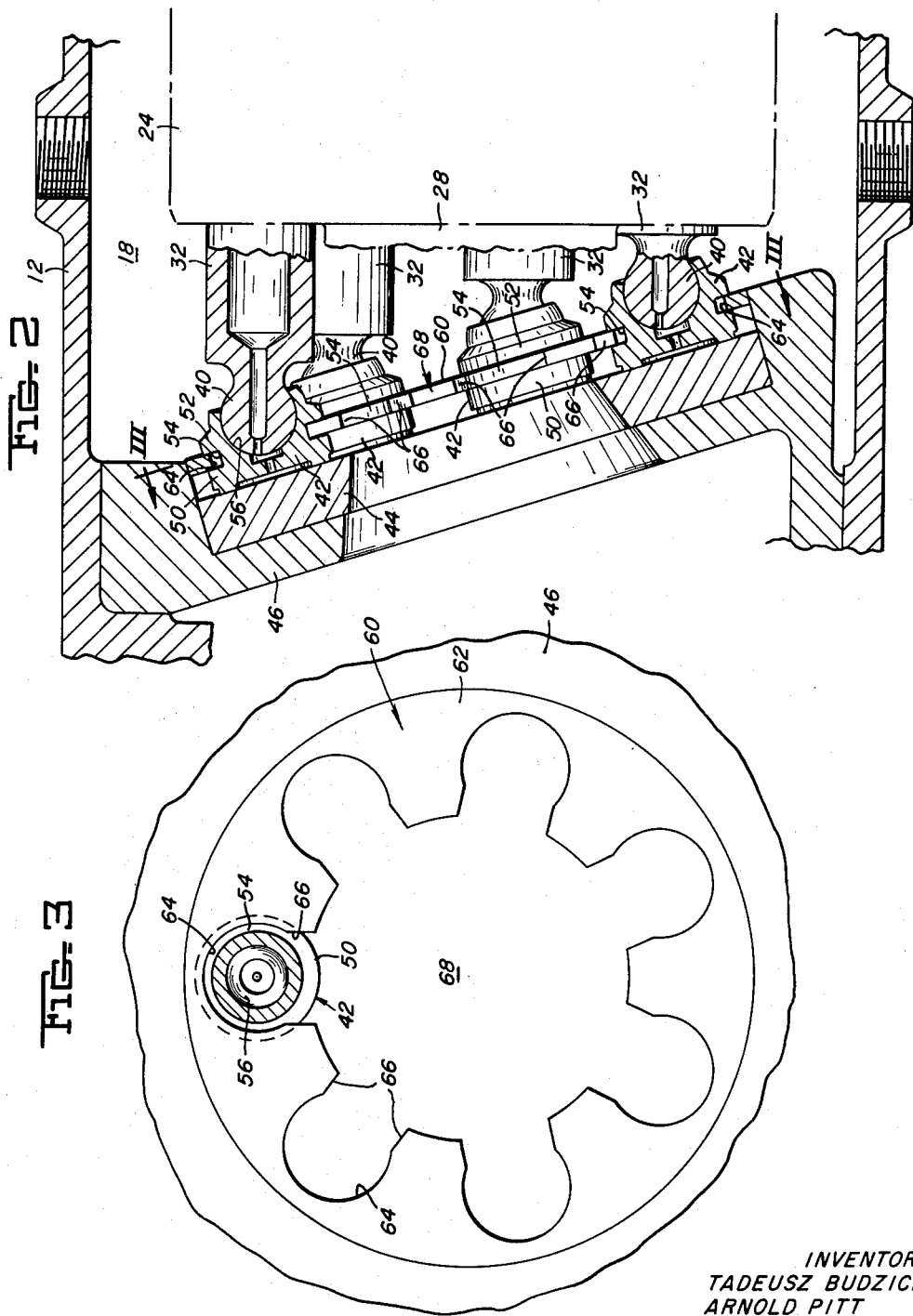

United States Patent Office
3,207,082
Patented Sept. 21, 1965

3,207,082
PISTON RETURN MECHANISM
Tadeusz Budzich, 3340 Colwyn Road, Cleveland, Ohio, and Arnold Pitt, 5 Hillgarden Road, Weston, Ontario, Canada
Filed Sept. 6, 1962, Ser. No. 221,801
5 Claims. (Cl. 103—162)

The present invention relates generally to fluid energy translating devices, such as fluid power pumps and fluid motors, embodying axial piston movement, and, in particular, to a piston return mechanism for use therewith that insures the proper piston return action.

Although the invention has broader application, it will be described with reference to a fixed displacement fluid power pump. In a pump of this type embodying axial piston movement, the rotary motion of an input shaft is converted to a reciprocating motion of a plurality of piston assemblies through the coaction of the piston assemblies witth an inclined cam plate. Piston return mechanisms other than individual piston return springs have been used. Those include connecting rods universally mounting the pistons, and nutating plates that constantly maintain the piston ends in engagemet with the cam plates. The use of idividual piston return springs has become the most widely used technique, however, because it provides a mechanically simple, inexpensive, and relatively reliable means for achieving piston return. It does, however, suffer from at least one serious disadvantage. When the pump is subjected to cold starts and consequently the oil is very viscous, or when particles of dirt lodge along the cylinder walls causing resistance sufficient to momentarily resist the piston return force provided by the piston return spring, such may cause the piston to momentarily leave the cam plate surface. When the impeding force is overcome by the piston return spring the resulting high velocity of piston movement to the cam plate may cause the piston shoe to be damaged by impact with the cam plate surface. This is particularly true when the centrifugal force incident to pump operation tilts the shoe radially so that the edge of the piston shoe strikes the cam plate surface.

It is a principal object of this invention to provide a free floating nutating plate that functionally connects all of the pistons and provides a means for transmitting the return forces from the pistons contacting the cam plate surface to a piston tending to leave the cam plate surface.

It is, also an object of this invention to utilize the return forces of the pistons on the discharge stroke to maintain the pistons on the suction stroke against the cam plate surface.

Still another object of this invention is to provide a piston return mechanism that prevents the piston shoes from tilting relative to each other, even in the extreme instance of all the piston shoes leaving the cam plate surface.

Still another object of this invention is to provide a piston return mechanism in which only the required return force necessary to maintain a particular piston against the cam plate is transmitted thereto from the remaining piston assemblies, and such force is transmitted only when the return force of the biasing spring associated with the piston is not sufficient to maintain it in contact with the cam plate surface.

These and other objects of the invention will become apparent from a consideration of the following description and drawings, in which:

FIGURE 2 is a sectional view of the piston shoe mounting employed with the present invention; and FIGURE 3 is a plan view of the nutating plate employed in the present invention.

Figure 1:
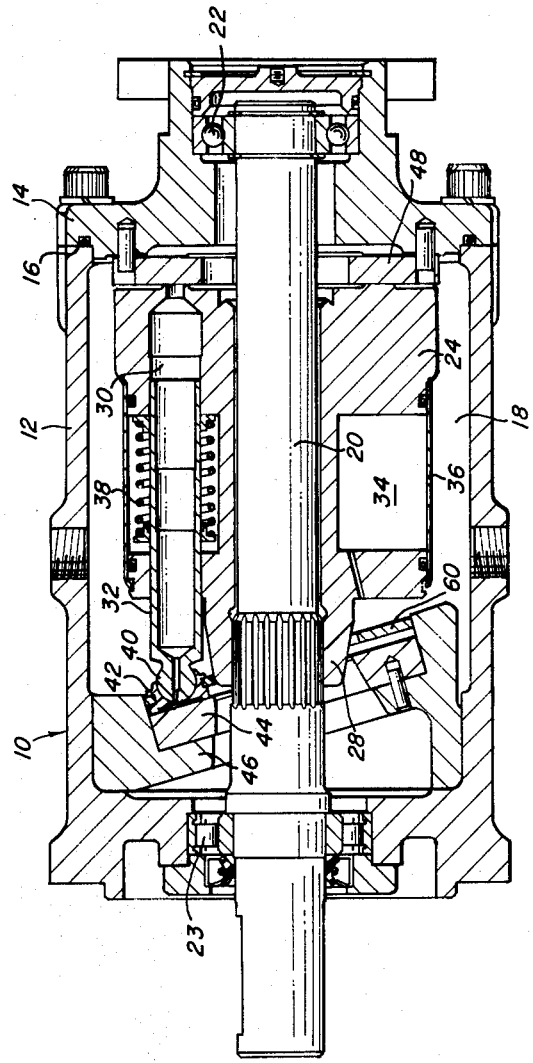
FIGURE 1 is an elevation view in section of a fluid power pump showing the piston return mechanism of this invention.

Referring to the drawings and, for the present, to FIGURE 1, a fluid power pump, designated generally as 10, is provided with a pump housing 12 and an end cover 14, suitably sealed by an O-ring seal 16, and defining a working chamber 18. A drive shaft 20, which may be drivingly connected to a prime mover (not shown), is journaled in the housing 12 and the end cover 14 by bearings 22 and 23, respectively. A cylinder barrel 24 is disposed in the chamber 18 and is in driving engagement with the shaft 20 by a splined connection with flange 28 provided on the cylinder barrel. The cylinder barrel 24 is provided with a plurality of cylinder bores 30 in which pistons 32 are slidably mounted. The cylinder barrel 24 is provided with an annular groove 34, closed by a ring 36, in which piston return springs 38 are positioned. The pistons 32 have part-spherical ends 40 onto which piston shoes 42 are universally mounted. The piston return springs 38, provide a biasing force tending to maintain the piston shoes 42 in sliding contact with a wear plate 44 that is mounted on an inclined cam plate 46 and constitutes a part thereof. The biasing force of the piston return springs 38 and the hydraulic forces incident to pump operation maintain the cylinder barrel in engagement with a valve plate 48, which in a well known manner phases the fluid output of the pump between input and discharge ports (not shown). The apparatus generally described thus far is conventional and does not constitute a part of the present invention.

As best shown in FIGURE 2, the piston shoes 42 are each provided with a pair of spaced annular flanges 50 and 52 defining therebetween an annular groove 54. The piston shoes have an internal part spherical surface 56 mating with the external part spherical end 40. This internal part spherical surface extends past the meridian of the part spherical end 40. A nutating plate 60, as shown in FIGURE 3 is provided and has an annular body 62 provided with arcuate openings 64 that are connected through slots 66 to a central bore 68. The diameter of the openings 64 is made greater than the diameter of the piston shoes 42 at the annular groove 54 thereof. The slots 66 are substantially equal to the diameter at the annular groove 54. With this arrangement, the nutating plate 60 is mounted on the piston shoes 42 with the openings 64 slidably positioned around the annular groove 54. Also, the outer periphery of the nutating plate may be journaled or peripherially supported on the cam plate 46, as shown in FIGURE 1. In the preferred embodiment however, the nutating plate is not rigidly connected to the cam plate, for a reason which will appear.

Referring again to FIGURE 1 of the drawings, the rotation of shaft 20 is transmitted to the cylinder barrel 24 through the splined connection at flange 28. During the rotation of the cylinder barrel, the piston shoes 42, under the biasing force of the piston return springs 38, follow the inclined surface of the wear plate 44 of the cam plate 46, which imparts a reciprocating motion to the pistons 32. This reciprocating motion, in a well known manner, induces fluid circulation in the cylinder bores 30; the fluid thus circulated is phased from the input port to the discharge port of the pump by the valve plate 48. During the discharge stroke of each piston, the total force of the hydraulic reaction will be biasing the piston shoe into contact with the wear plate. During the suction stroke of each piston, the piston shoe is maintained in contact with the wear plate by the biasing force of the piston return spring, which under most operating conditions is sufficient for this purpose. However, if a resistance force, such as dirt particles within the cylinder bore or a high viscosity fluid, should become sufficient to overcome the return force of the piston return springs and the piston shoe tends to leave the wear plate, the biasing forces of the remaining pistons will be transmitted by the nutating plate to the piston subjected to this increased resitsance force. It may be seen, therefore, that the nutating plate utilizes the biasing forces and hydraulic reaction forces of the other pistons to momentarily supplement the biasing force of a particular piston return spring. This supplemental force is applied to the piston through the flange of the shoe engaging the part spherical piston end 40.

Under severe operating conditions, such as sub-zero temperatures, that cause the fluid to be very viscous, and with the pump discharging at low pressure, all the piston shoes may momentarily leave the wear plate. With conventional nutating plates that are rigidly secured to the cam plate, under these extreme conditions the pistons would be torn from the shoes. However, with the mechanism of this invention under these extreme conditions the piston shoes will merely leave the wear plate surface as a functionally connected unit. When the return forces are sufficient to overcome the resisting forces, the piston shoes will return to the cam plate surface as a functionally connected unit. Also, with the piston shoes functionally interconnected in this way, when they lift from the cam plate they are maintained co-planar in the plane of the nutating plate, and they are prevented from twisting out of line. Thus, the edges will not strike the cam plate when they return which means there is less possibility of damage to the cam plate and the piston shoes. Rather, the nutating plate will have maintained the piston shoes in proper alignment so that the lower surfaces of the shoes come into contact with the cam plate when they return after having been lifted therefrom.

Although the invention has been described with reference to particular applications, the principles involved are susceptible to numerous other applications that will be readily apparent to persons skilled in the art; therefore, the invention is to be limited only by the scope and spirit of the appended claims.

What is claimed is:

1. In a fluid energy translating device including a housing and valving means, a cylinder barrel having a plurality of cylinder bores communicating with said valving means, pistons arranged for reciprocation in said cylinder bores, a cam plate operationally engaging said pistons, the combination therewith of a piston return mechanism comprising, spring means biasing each piston toward said cam plate, piston shoes universally mounted on said pistons and having surfaces bearing against said cam plate, and plate means operatively interconnecting said piston shoes, said plate means and said piston shoes having co-acting means to prevent tilting of said piston shoes with respect to each other and to maintain said surfaces of said piston shoes co-planar while permitting relative movement of said piston shoes with respect to said plate means in the plane of said plate means, said plate means being peripherially supported and configured and arranged to move away from said cam plate with said piston shoes, whereby when the forces resisting the pistons' return exceed the biasing forces of the spring means and the piston shoes lift from said cam plate the bearing surfaces of said piston shoes are maintained co-planar by said plate means.

2. In a fluid energy translating device including a housing and valving means, a cylinder barrel having a plurality of cylinder bores communicating with said valving means, pistons arranged for reciprocation in said cylinder bores, a cam plate operationally engaging said pistons, the combination therewith of a piston return mechanism comprising, spring means biasing each piston toward said cam plate, piston shoes universally mounted on said pistons and having surfaces bearing against said cam plate, said piston shoes having a section engaging the part spherical ends of said piston shoes over an area that extends past the meridian of said part spherical ends, and plate means operatively interconnecting said piston shoes, said plate means and said piston shoes having co-acting means to prevent tilting of said piston shoes with respect to each other and to maintain said surfaces of said piston shoes co-planar while permitting relative movement of said piston shoes with respect to said plate means in the plane of said plate means, said plate means being peripherially supported and configured and arranged to move away from said cam plate with said piston shoes, whereby when the forces resisting the pistons' return exceed the biasing forces of the spring means and the piston shoes lift from said cam plate the bearing surfaces of said piston shoes are maintained co-planar by said plate means.

3. In a fluid energy translating device including a housing and valving means, a cylinder barrel having a plurality of cylinder bores communicating with said valving means, pistons arranged for reciprocation in said cylinder bores, a cam plate operationally engaging said pistons, the combination therewith of a piston return mechanism comprising, spring means biasing each piston toward said cam plate, piston shoes universally mounted on said pistons and having surfaces bearing against said cam plate, said piston shoes each having an annular groove, and a nutating plate engaging said piston shoes at said grooves to prevent said tilting of said piston shoes with respect to each other and to maintain said surfaces of said piston shoes co-planar while permitting relative movement of said piston shoes with respect to said nutating plate in the plate of the nutating plate, said plate means being peripherially supported and configured and arranged to move away from said cam plate with said piston shoes, whereby when the forces resisting the pistons' return exceed the biasing forces of the spring means and the piston shoes lift from said cam plate the bearing surfaces of said piston shoes are maintained co-planar by said plate means.

4. The combination of claim 3 further characterized by said nutating plate having openings corresponding to said grooves, said openings having a loose fit in said grooves to permit limited relative movement of said piston shoes and said nutating plate in the plane of said nutating plate.

5. In a fluid energy translating device including a housing and valving means, a cylinder barrel having a plurality of cylinder bores communicating with said valving means, pistons arranged for reciprocation in said cylinder bores, a cam plate operationally engaging said pistons, the combination therewith of a piston return mechanism comprising, spring means biasing each piston toward said cam plate, piston shoes universally mounted on said pistons and having surfaces bearing against said cam plate, said piston shoes having a section engaging the part spherical ends of said piston shoes over an area that extends past the meridian of said part spherical ends, said piston shoes each having an annular groove, and a nutating plate engaging said piston shoes at said grooves to prevent said tilting of said piston shoes with respect to each other and to maintain said surfaces of said piston shoes co-planar while permitting relative movement of said piston shoes with respect to said nutating plate in the plane of the nutating plate, and a nutating plate having openings engaging said pistons' shoes at said annular grooves to prevent tilting of said pistons' shoes with respect to each other and to maintain said surfaces of said piston shoes co-planar, said openings fitting loosely in said grooves to permit limited relative movement of said nutating plate and the piston shoes in the plane of the nutating plate, said plate means being peripherially supported and configured and arranged to move away from said cam plate with said piston shoes, whereby when the forces resisting the pistons' return exceed the biasing forces of the spring means and the piston shoes lift from said cam plate the bearing surfaces of said piston shoes are maintained co-planar by said plate means.

References Cited by the Examiner

UNITED STATES PATENTS

| | | | |
|---|---|---|---|
| 2,093,477 | 9/37 | Parsons | 103—173 |
| 2,525,498 | 10/50 | Naylor et al. | 103—162 |
| 2,709,339 | 5/55 | Edelman et al. | 103—162 |

LAURENCE V. EFNER, *Primary Examiner.*